(12) United States Patent
McClure et al.

(10) Patent No.: US 11,588,314 B2
(45) Date of Patent: Feb. 21, 2023

(54) BANDING FOR HIGH VOLTAGE APPLICATIONS

(71) Applicant: GANNETT FLEMING, INC., Camp Hill, PA (US)

(72) Inventors: Timothy Brian McClure, Chesterfield, MO (US); Anthony R. Zamberlan, Phoenix, AZ (US)

(73) Assignee: GANNETT FLEMING, INC., Camp Hill, PA (US)

( * ) Notice: Subject to any disclaimer, the term of this patent is extended or adjusted under 35 U.S.C. 154(b) by 204 days.

(21) Appl. No.: 17/220,474

(22) Filed: Apr. 1, 2021

(65) Prior Publication Data

US 2022/0319760 A1    Oct. 6, 2022

(51) Int. Cl.
*H02G 15/22* (2006.01)

(52) U.S. Cl.
CPC .................................. *H02G 15/22* (2013.01)

(58) Field of Classification Search
CPC ....................................................... H02G 15/22
USPC ........................................................ 174/75 R
See application file for complete search history.

(56) References Cited

U.S. PATENT DOCUMENTS

| | | | | |
|---|---|---|---|---|
| 3,390,227 A | * | 6/1968 | Shlesinger, Jr. ....... | H01R 4/206 439/423 |
| 4,640,982 A | * | 2/1987 | Kasper ..................... | H01R 9/11 29/862 |
| 2005/0191910 A1 | * | 9/2005 | Bertini ................... | H02G 15/22 439/676 |

* cited by examiner

*Primary Examiner* — Timothy J Thompson
*Assistant Examiner* — Michael F McAllister
(74) *Attorney, Agent, or Firm* — Potomac Law Group, PLLC; Bruce Wolstoncroft

(57) ABSTRACT

Banding and clamp for use to in high voltage environments of over 15 kV. The banding includes and inner core and an outer insulative layer. The inner core has non-piercing edges. The inner core is configured to have strength to prevent movement of components to which the banding is attached. The outer insulative layer surrounds at least a portion of the inner core. The outer insulative has a phase-to-ground rating of greater than 15 kV.

20 Claims, 3 Drawing Sheets

BANDING FOR HIGH VOLTAGE APPLICATIONS

FIELD OF THE INVENTION

The present invention relates generally to banding with an insulative outer sleeve. In particular, the invention relates to insulative banding which can be used in high voltage environments.

BACKGROUND OF THE INVENTION

Banding or clamps are used for many applications to retain one component in relation to another component. The banding is configured to have the strength required to hold the components together over time. Various bands may include a cover or layer which is used to provide a cushioned surface between the inner strength core of the banding and the components, thereby preventing the inner strength core from damaging the components.

While banding is useful in many applications, in high voltage environments, known banding cannot be used as the banding can case arcing or other types of problems which can lead to the failure of the components or the system.

It would, therefore, be beneficial to provide banding which overcomes the deficiencies of the prior art. In particular, it would be beneficial to provide insulative banding which can be used effectively in high voltage environments.

SUMMARY OF THE INVENTION

An embodiment is directed to banding for use to in high voltage environments of over 15 kV. The banding includes and inner core and an outer insulative layer. The inner core has non-piercing edges. The inner core is configured to have strength to prevent movement of components to which the banding is attached. The outer insulative layer surrounds at least a portion of the inner core. The outer insulative has a phase-to-ground rating of greater than 15 kV.

An embodiment is directed to a clamp for use with components which are configured to accommodate high voltage. The clamp includes an inner core, which is configured to have strength to prevent movement of the components to which the clamp is attached. A tightening member is provided proximate at least one end of the inner core. The tightening member is provided to tighten the clamp about the components to secure the components together. An outer insulative layer surrounds at least a portion of the inner core. The outer insulative layer has a phase-to-ground rating greater than 15 kV.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
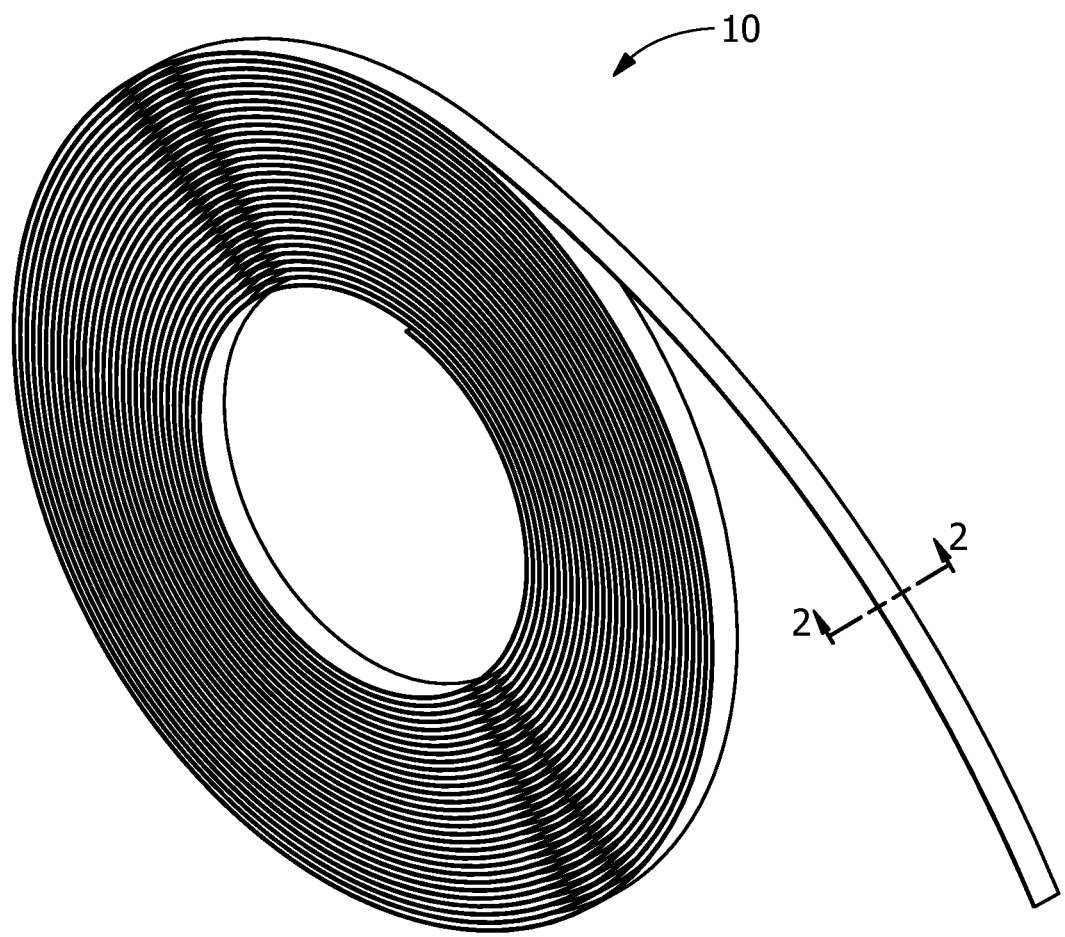
FIG. 1 is a perspective view of an illustrative embodiment of a continuous banding of the present invention, shown in a roll.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIG. 1, banding or band 10 may be a continuous member which can be cut to the size desired. Alternatively, each individual band may be formed to a particular length.

Figure 2:
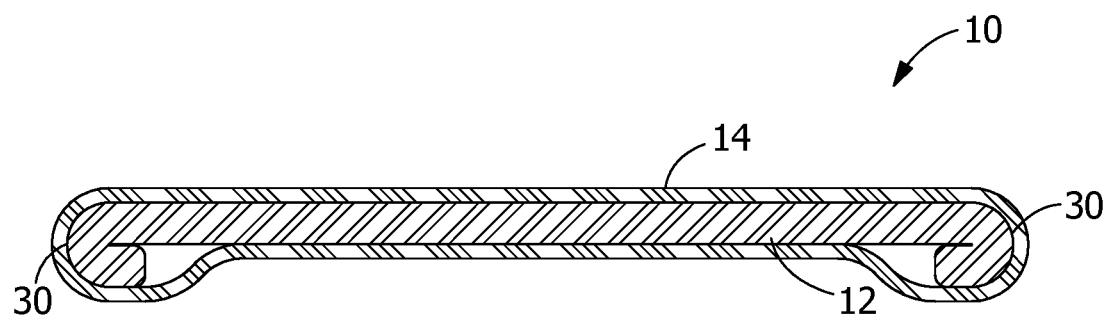
FIG. 2 is a cross-sectional of the banding taken along line 2-2 of FIG. 1.
Figure 5:
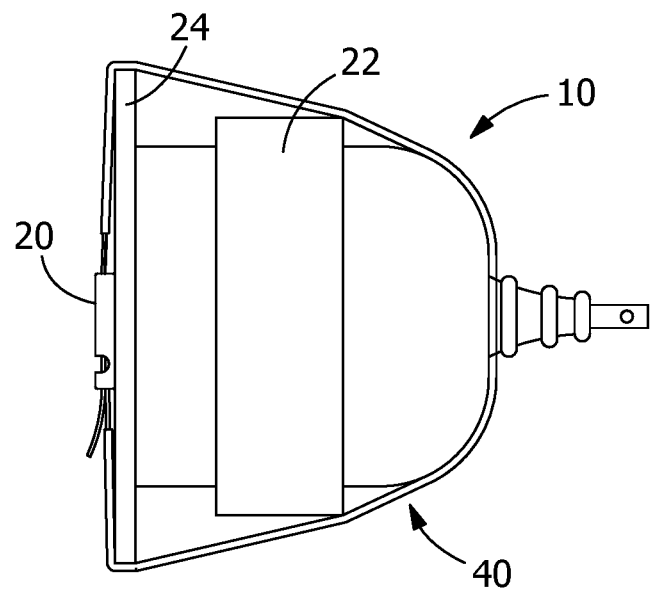
FIG. 5 is a diagrammatic view of the clamp tightened around component to secure the component in position relative to each other.

As shown in FIG. 2, the banding 10 has an inner core 12 and an outer insulative layer 14. The inner core 12 has sufficient strength to prevent the failure of the inner core 12 as the banding 10 positioned and tightened about components 22, 24 (FIG. 5). The banding 10 retains the components 22, 24 in position relative to each other and relative to the system in which the components are positioned. In the illustrative embodiment shown in FIG. 5, component 22 is potential transformer and component 24 is a grounded base. However, the components shown in FIG. 5 are meant to be illustrative rather than limiting.

The inner core 12 may be made of any material having the strength characteristics desired, including, but not limited to, metal, such as stainless steel or aluminum or non-metallic and non-conductive materials such as fiberglass or nylon. In the illustrative embodiment shown in FIG. 2, the inner core 12 has a generally rectangular cross-section. However, other cross-sectional shapes may be used, including, but not limited to, square and round shapes.

As shown in FIG. 2, the inner core 12 has rounded or non-piercing edges 30. The non-piercing edges 30 may be formed during the manufacture of the inner core 12 or the edges of the inner core 12 may be modified prior to assembly to remove any sharp or piercing edges. Inner cores 12 with a circular or arcuate circumference are also defined to have non-piercing edges 30. In the illustrative embodiment shown, the inner core 12 has edges which are folded over and stamped to form the rounded edges, but other types of type of rounded or non-piercing edges may be used.

The outer insulative layer 14 surrounds or encapsulates the inner core 12. The outer insulative layer 14 is made from material having a phase-to ground rating of greater than 15 kV, greater than 20 kV, greater than 25 kV, between 15 kV and 25 kV.

Although the material of the outer insulative layer 14 is rated as described above, the banding 10 may be used in any application in which the kV is less than the phase-to-grounding ratio of the outer insulative layer 14. In alternate embodiments, thicker layers or multiple layers of the outer insulative layer 14 may be positioned on the inner core 12, to achieve a higher phase-to ground rating to provide a higher insulating value.

The outer insulative layer 14 may be, but is not limited to, a sleeve which is positioned over the inner core 12, a tape which is wrapped over the inner core 12, or a layer which is molded over the inner core 12. In various embodiments, the outer insulative layer 14 may be non-tacky, self-fusing member, such as, but not limited to, silicone rubber tape. An example of a commercially available silicone rubber tape is the Silicone Self Fusing Tape manufactured by Midsun Group Inc. The outer insulative layer 14 may be made from, but is not limited to, silicone, ethylene propylene, cross-linked polyethylene or other electrical insulations.

Figure 3:
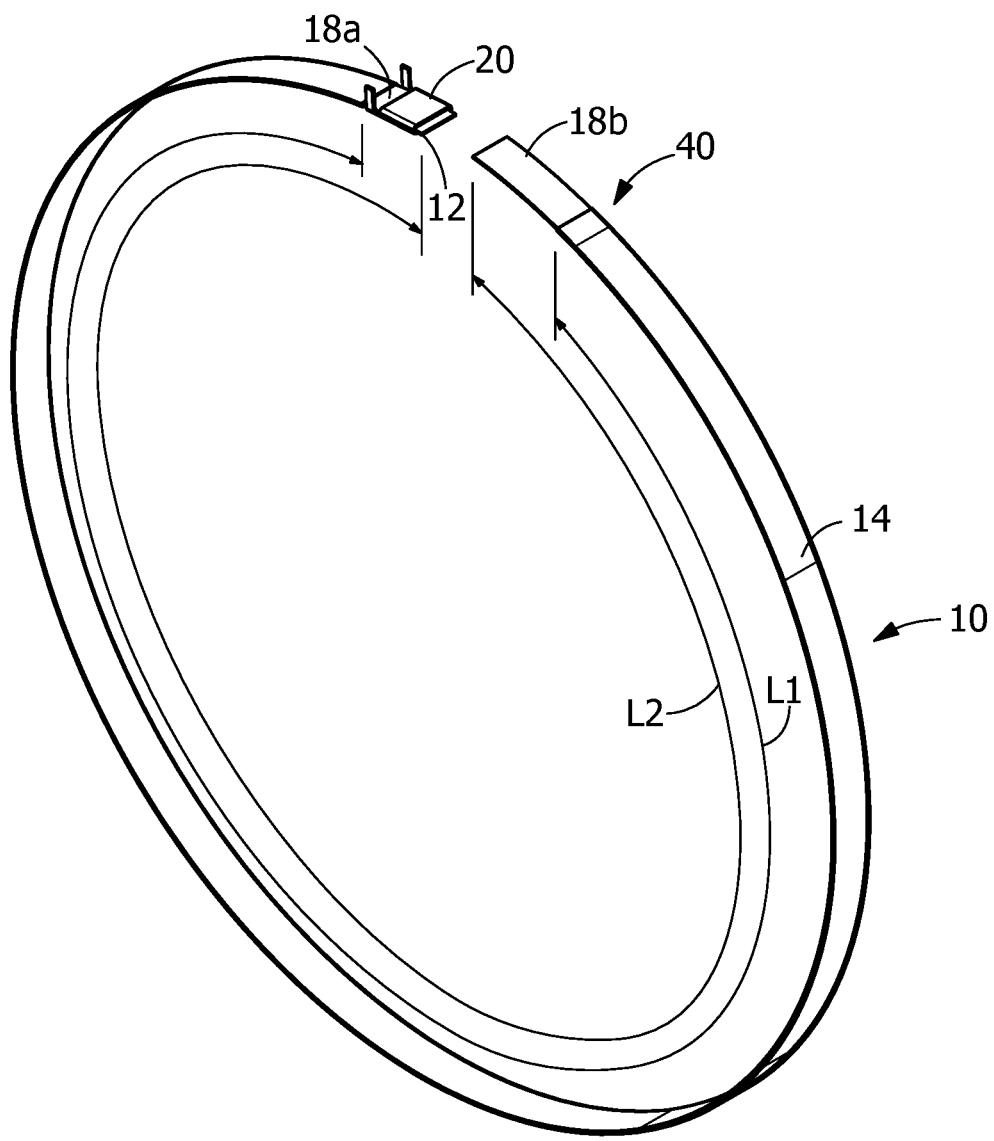
FIG. 3 is a perspective view of an illustrative embodiment of a clamp of the present invention, the clamp is shown in an open position.
Figure 4:
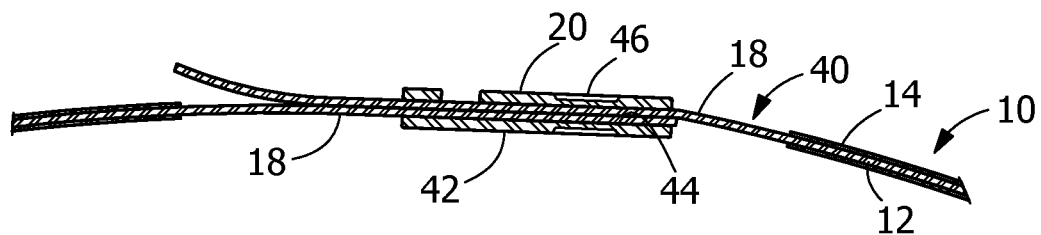
FIG. 4 is a partial cross-sectional view of the clamp taken along the center axis of the banding, the clamp is shown in the closed position.

As shown in FIGS. 3 through 5, the banding 10 may be provided in the form of a clamp 40. The clamp 40 includes the inner core 12, the outer insulative layer 14 and a tightening member 20. In the embodiment shown, the inner core 12 has a length L1 and the outer insulative layer 14 has a length L2, with L2 being shorter than L1. The outer insulative layer 14 is positioned about portion of the inner core 12. Portions 18 of the inner core 12 at the end of the inner core 12 do not have the outer insulative layer 14 positioned thereon.

As shown in FIG. 4, the tightening member 20 is provided on the end portions 18 of the inner core 12. In the embodiment shown, the tightening member 20 is a clamping member which is mechanically compressed to retain the end portions 18 is mechanical engagement with each other. The clamping member 20 is attached to one end portion 18a of the clamp 40. The clamping member 20 has a base 42 with a tongue receiving surface 44. A securing portion 46 is attached to the base 42. Alternate embodiments of the tightening member 20 may be used. For example, the tightening member may be a screw type clamp or a rachet device positioned at one end of the clamp 40 and a tongue at the other end of the clamp 40. The tongue may include grooves. When the clamp 40 is bent into a circular member, the tongue will be inserted into a cavity of the rachet device, allowing the rachet device to cooperate with the grooves of the tongue.

In operation, when the clamp 40 is properly positioned around the components 22, 24, a tongue or one end 18b of the clamp 40 is positioned on the tongue receiving surface 44 of the clamping member 20 and is pulled tight to securely position the clamp 40 around the components 22, 24. The securing portion 46 is then moved over the end 18b and tightened or crimped, preventing the removal of the end 18b from the clamping member 20. In this position, the clamp 40 cooperates with the components 22, 24 to secure and retain the components 22, 24 in position relative to each other. Any excess material of the of the end portion 18b which extends from the clamping device 20 may be removed if desired.

As shown in FIG. 5, when in use, as the ends 18 of the clamp 40 are not insulated, the clamping device 20 is positioned at a safe phase-ground location relative to the components 22, 24, i.e., a position which does not require the high phase-to-ground ratio rating as required in the portion 16 of the clamp 40.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. Banding for use to in high voltage environments of over 15 kV, the banding comprising;
    an inner core, the inner core having non-piercing edges, the inner core configured to have strength to prevent movement of components to which the banding is attached;
    an outer insulative layer, the outer insulative layer surrounding at least a portion of the inner core, the outer insulative having a phase-to-ground rating of greater than 15 kV.

2. The banding as recited in claim 1, wherein the outer core is a non-tacky silicone material.

3. The banding as recited in claim 2, wherein the outer insulative layer is a sleeve which is positioned around the inner core.

4. The banding as recited in claim 2, wherein the outer insulative layer is wrapped around the inner core.

5. The banding as recited in claim 1, wherein the outer core is a silicone self-amalgamating tape.

6. The banding as recited in claim 1, wherein the inner core is made from metal.

7. The banding as recited in claim 1, wherein the inner core is made from a non-metallic and non-conductive material.

8. The banding as recited in claim 1, wherein the inner core is made from fiberglass.

9. The banding as recited in claim 1, wherein the inner core is made from nylon.

10. A clamp for use with components which are configured to accommodate high voltage, the clamp comprising;
    an inner core, the inner core configured to have strength to prevent movement of the components to which the clamp is attached;
    a tightening member provided proximate at least one end of the inner core, the tightening member provided to tighten the clamp about the components to secure the components together;
    an outer insulative layer, the outer insulative layer surrounding at least a portion of the inner core, the outer insulative layer having a phase-to-ground rating greater than 15 kV.

11. The clamp as recited in claim 10, wherein the outer core is a non-tacky silicone material.

12. The clamp as recited in claim 11, wherein the outer insulative layer is a sleeve which is positioned around the inner core.

13. The clamp as recited in claim 11, wherein the outer insulative layer is a wrap which is wrapped around the inner core.

14. The clamp as recited in claim 10, wherein the outer core is a silicone self-amalgamating tape.

15. The clamp as recited in claim 10, wherein the inner core is made from metal.

16. The clamp as recited in claim 10, wherein the inner core is made from a non-metallic and non-conductive material.

17. The clamp as recited in claim 10, wherein the inner core is made from fiberglass.

18. The clamp as recited in claim 10, wherein the inner core is made from nylon.

19. The clamp as recited in claim 10, wherein the inner core has non-piercing edges.

20. The clamp as recited in claim 10, wherein the inner core has a first length and the outer insulative layer has a second length, the second length being shorter than the first length, wherein a tightening member mounting portion is provided on an exposed portion of the inner core.

\* \* \* \* \*